United States Patent [19]
Marcus

[11] Patent Number: 5,307,238
[45] Date of Patent: Apr. 26, 1994

[54] AVIONICS DISPLAYS SYSTEM WITH COLLAPSIBLE MOUNTING HANDLE

[75] Inventor: Russell D. Marcus, Shellsburg, Iowa

[73] Assignee: Rockwell International Corporation, Seal Beach, Calif.

[21] Appl. No.: 917,728

[22] Filed: Jul. 20, 1992

Related U.S. Application Data

[63] Continuation of Ser. No. 648,454, Jan. 31, 1991, abandoned.

[51] Int. Cl.$^5$ .................. H05K 7/12; H05K 7/14; E05C 5/04
[52] U.S. Cl. .................. 361/681; 248/27.1; 439/362; 244/1 R; 292/251; 292/252; 361/726
[58] Field of Search .............. 361/331, 346, 380, 390, 361/391, 394, 422, 423, 424, 429; 248/27.1; 439/362, 364, 365, 476, 483; 244/1 R; 211/26; 49/460; 292/251, 252; 312/215

[56] References Cited

U.S. PATENT DOCUMENTS

| | | | |
|---|---|---|---|
| 2,609,268 | 9/1952 | Nye | 361/391 X |
| 2,802,997 | 8/1957 | Bronckhurst et al. | 361/391 X |
| 3,122,012 | 2/1964 | Christopher | 292/251 X |
| 3,222,899 | 12/1965 | Bodoh et al. | 292/251 X |
| 3,299,678 | 1/1967 | Spencer | 292/251 X |
| 3,302,434 | 2/1967 | Dauenbaugh et al. | 292/251 X |
| 3,467,891 | 9/1969 | Mogle | 312/320 X |
| 4,071,271 | 1/1978 | Bourrie et al. | 292/252 X |
| 4,089,040 | 5/1978 | Paulsen | 361/383 |
| 4,483,639 | 11/1984 | McCandess, II | 292/252 X |
| 4,506,439 | 3/1985 | Roake | 361/395 X |
| 4,562,978 | 1/1986 | Durbin et al. | 244/1 R |
| 4,687,172 | 8/1987 | Stillback | 248/27.1 X |
| 4,845,591 | 7/1989 | Pavie | 361/391 |
| 4,850,896 | 7/1989 | Smith et al. | 439/362 X |
| 4,931,907 | 6/1990 | Robinson et al. | 361/391 |
| 4,939,622 | 7/1990 | Weiss et al. | 361/391 |

FOREIGN PATENT DOCUMENTS 741492 6/1980 U.S.S.R. .................. 361/429

Primary Examiner—Leo P. Picard
Assistant Examiner—Michael W. Phillips
Attorney, Agent, or Firm—Gregory G. Williams; M. Lee Murrah; H. Fredrick Hamann

[57] ABSTRACT

An avionics display device having a stowable rotatable locking handle disposed therein for facilitating quick and easy installation and/or removal of the display device.

1 Claim, 3 Drawing Sheets

AVIONICS DISPLAYS SYSTEM WITH COLLAPSIBLE MOUNTING HANDLE

This Application is a file wrapper continuation of application Ser. No. 07/648,454 filed Jan. 31, 1991, now abandoned.

BACKGROUND OF THE INVENTION

The present invention relates to aircraft instrument panels and more particularly concerns avionics displays and even more particularly relates to avionics displays with improved mounting capabilities.

In recent years there has been a trend in the avionics industry to consolidate numerous flight instruments into several multi-purpose display devices. A further trend has been to reduce the number of multi-purpose display devices by increasing the display area on each single display.

Historically, aircraft cockpits are usually quite crowded and allow very little room for maintenance workers to operate comfortably. In the past, it is often difficult for aircraft maintenance personnel to remove and or install avionics equipment in the aircraft instrument panel. This difficulty is exacerbated when the displays grow larger in size and weight.

Typically, the aircraft instrument panel includes therein some structual portions of the aircraft. Avionics mounts are attached to these structual portions, usually by screws, bolts, etc. The avionics equipment is then secured to the mount with screws, bolts, etc.

While this system of mounting avionics displays has enjoyed considerable use in the past, it does have several serious drawbacks. First of all, it is often difficult for the maintenance personnel to remove the avionics equipment because they must loosen the screws, etc. being careful to properly grasp the equipment etc. and then extract the equipment by using one hand to pull on the equipment and using the other to support its weight. Equipment is occasionally dropped by the maintenance personnel, either immediately after extraction or immediately before insertion because of the physical contortions they are often required to undergo because of the crowded and cramped nature of aircraft cockpits. When the equipment is these newer and larger avionics displays, which often are heavy and contain bulky and fragile cathode ray tubes or other displays screens, this can be extremely expensive. Thirdly, the maintenance personnel occasionally damage the panel or neighboring instruments when the tools which are used to loosen the screws or pry the equipment out come in contact with the panel or the neighboring instruments.

Consequently, there exists a need for improvement in the mounting of avionics display systems.

SUMMARY OF THE INVENTION

It is an object of the present invention to provide for easy installation or removal of avionics display devices.

It is a feature of the present invention to provide an attached handle.

It is an advantage of the present invention to allow the maintenance personnel to carry the avionics display device with one hand.

It is another object of the present invention to provide for a quick installation or removal of avionics display devices.

It is another feature of the present invention to provide a spring-latched rotatable locking handle.

It is another advantage of the present invention to allow for a simple disconnection of the avionics display from the mount.

The present invention provides an improved avionics display device which is designed to satisfy the aforementioned needs, produce the above described objects, include the previously discussed features and achieve the already disclosed advantages. The present invention is a "bracket-less", "screw-less", and "tool-less" system in the sense that the brackets, screws and tools which are typically associated with connecting the display device with the avionics mount have been eliminated. Instead, a display with an improved mounting system with a rotatable locking handle is provided.

Accordingly, the present invention involves an avionics display system that includes an avionics equipment mounting tray, the display device having a stowable rotatable locking handle thereon which contains therein spring-latches.

BRIEF DESCRIPTION OF THE DRAWINGS

The invention will be best understood by reading of the detailed description in conjunction with the appended drawings in which.

DETAILED DESCRIPTION

Figure 1A:
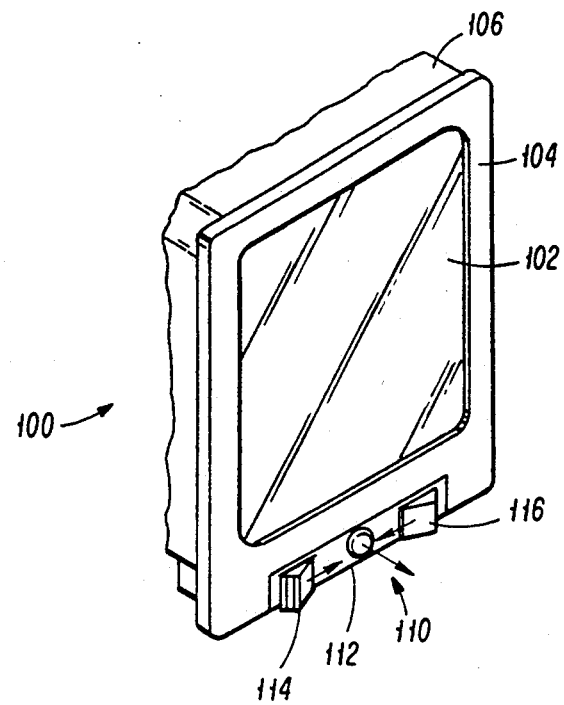
FIG. 1A is a perspective drawing of an avionics display device, of the present invention, showing the handle stowed before removal is attempted.

Now referring to the Figures, where like numbers refer to like structure throughout and more particularly referring to FIG. 1A, there is shown the avionics display device of the present invention, generally designated 100, shown having display screen 102, bezel 104, box 106, handle assembly 110 which includes handle 112, first spring-latch 114, second spring-latch 116 and release button 118. The handle is shown in the stowed position which would correspond to the position after the display device had been installed in the mounting tray.

Figure 1B:
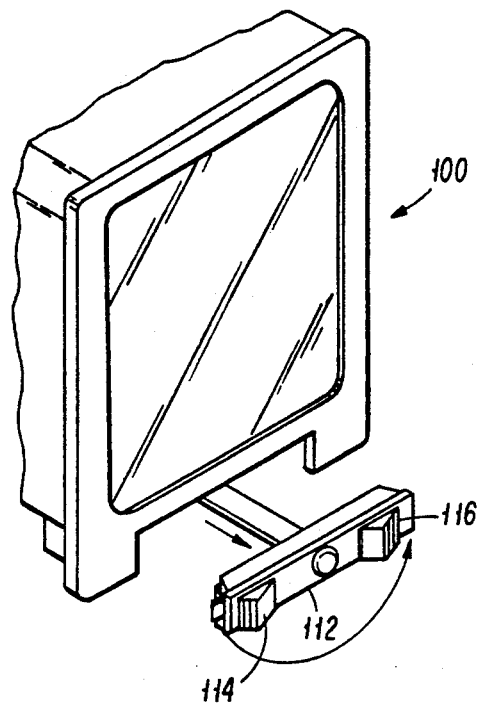
FIG. 1B is a perspective drawing of an avionics display device, of the present invention, showing the handle pulled forward as a step in the removal process.

Now referring to FIG. 1B, there is shown the avionics display device 100, of the present invention, in the process of extraction from the mounting tray and aircraft instrumentation panel (not shown). The handle 112 is shown displaced from the bezel 104. The handle is shown oriented in a horizontal manner but further is shown to be rotatable in a counterclockwise direction in order to disengage the display device from the mounting tray. A complete counterclockwise rotation of the handle 112 through several rotations will eventually disengage the display device from the mounting tray.

Figure 1C:
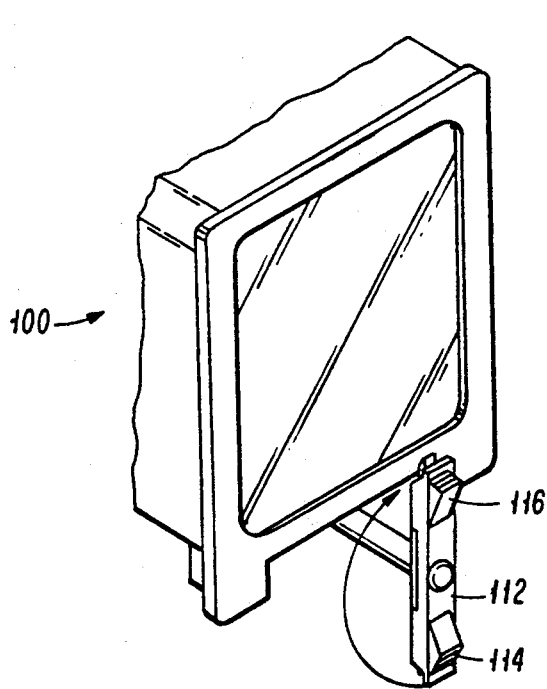
FIG. 1C is a perspective drawing of an avionics display device, of the present invention, showing the handle oriented in a vertical position which demonstrates the position prior to insertion of the display device into the mounting tray.

Now referring to FIG. 1C, there is shown the avionics display device 100 of the present invention in the process of installation into the mounting tray (not shown). The avionics display device 100 has been inserted into the tray with the handle 112 oriented in an extended position. When the display device 100 is fully slid into the mounting tray the handle 112 is rotated in a clockwise direction until the handle stops.

Figure 1D:
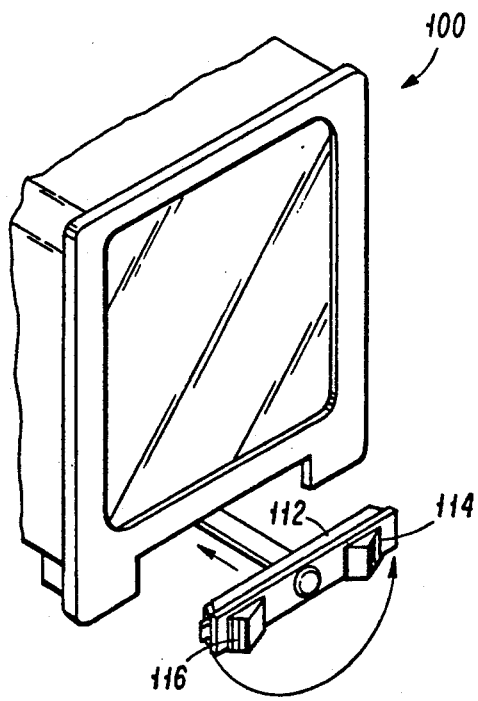
FIG. 1D is a perspective drawing of an avionics display device, of the present invention, showing the handle pulled away from the display device and in a horizontal orientation after it has been rotated from the vertical position to a locked condition.

Now referring to FIG. 1D, there is shown the avionics display device 100, of the present invention, with the handle 112 disposed in a horizontal arrangement, this can be achieved by returning the handle in a counter-clockwise direction, after it has been fully rotated in a clockwise direction, so that, it is oriented horizontally and then capable of being translated toward the bezel 104.

Figure 2:
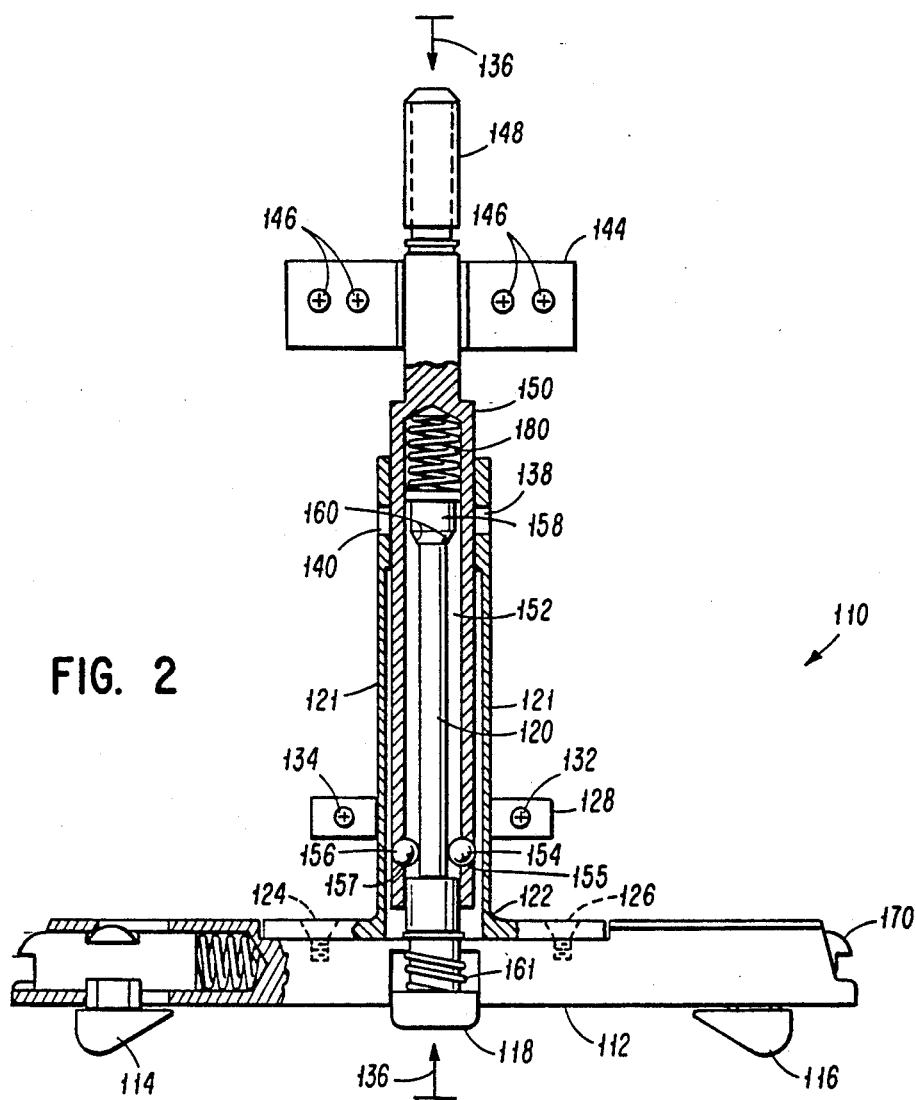
FIG. 2 is a cross-sectional view of the handle assembly of the present invention.

Now referring to FIG. 2, there is shown the handle assembly 110, of the present invention having handle 112, first spring-latch 114, second spring-latch 116 and release button 118. Button 118 is connected with elongated rod 120 which extends through the walls 121 of outer tube 122 which is coupled to handle 112 by screws 124 and 126. Outer tube 122 is disposed through a hole in retaining bar 128, so that, the tube 122 is allowed to slide through the retaining bar 128 which is attached to the display device box 106 (FIG. 1A) by screws 132 and 134. The elongated rod 120 is shown centrally disposed within the outer tube 122 along the central symmetry line 136. Outer bearing receiving voids 138 and 140 are shown disposed in the walls 121 of the outer tube 122. When the outer tube 122 is caused to slide through mounting member 128 the bearing receiving voids 138 and 140 are caused to be positioned at a location more closer to the mounting member 128. Also shown is mounting member 144 which is attached to the box 106 through screws 146. Coupled with mounting member 144 is threaded shaft 148 which is coupled with inner tube 150. Both threaded shaft 148 and inner tube 150 are capable of rotational movement within the mounting member 144. Furthermore, inner tube 150 extends toward mounting member 128 and is disposed within the outer tube 122. Inner tube 150 is shown having a void 152 for receiving the elongated rod 120. The exterior surface of inner tube 150 is configured, preferably, in a hexagonal relationship for cooperating with the interior surface of outer tube 122 which is also configured hexagonally. Consequently, when outer tube 122 is rotated, in either direction, the inner tube 150 and threaded shaft 148 are also rotated. The outer tube 122 is capable of translational motion along the symmetry line 136 and traveling along the outer tube 150 which has contained therein ball bearings 154 and 156 in interior ball bearing receiving voids 155, 157, respectively therein. As the outer tube 122 is slid along the symmetry line 136 the interior end 158 of rod 120 approaches the ball bearings 154 and 156. Ball bearing retaining voids 138 and 140 are also caused to translate along the symmetry line when the outer tube is slid in that direction. When the interior end 158 of the elongated rod 120 contacts the bearings 154 and 156 voids 138 and 140 are then positioned to allow the bearings to recede from the symmetry line as they are forced by the ramp 160 on the interior end 158 of rod 120. The bearing receiving voids 138 and 140 are disposed at positions, so that, the ball bearings 154 and 156 do not initially enter the voids when they contact the ramp 160. In order for the bearings 154 and 156 to recede into voids 138 and 140 respectively there must be a relative displacement between the ramp 160 and the voids 138 and 140. This is accomplished by further pulling on the handle 112 and outer tube 122 so that the spring 161 is caused to compress, thereby allowing the relative motion between rod 120 and tube 122. When bearings 154 and 156 are received by voids 138 and 140 respectively, tubes 122 and 150 are held securely in place with respect to each other, thereby reducing the likelyhood that the handle will collapse on the maintenance workers fingers.

Also shown in FIG. 2 is second spring-latch 116 which is capable of sliding notch 170 inward and thereby disengaging it from the bezel 104 (not shown). First spring-latch 114 is designed and operated similarly. The notch 170 allows the handle 112 to be securely positioned with the bezel 104.

Figure 3:
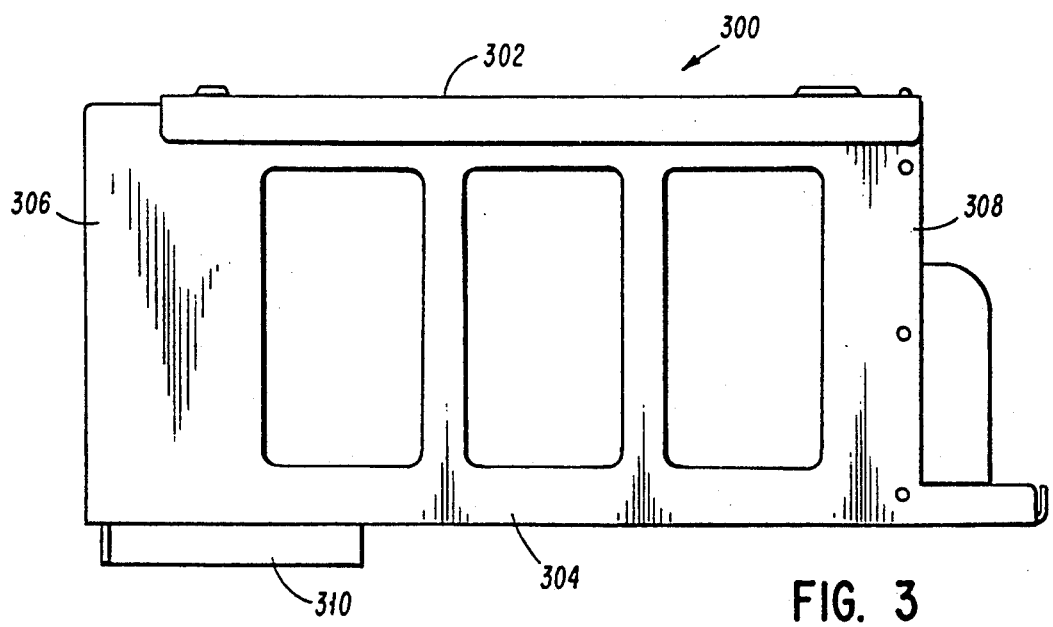
FIG. 3 is a side view of the mounting tray of the present invention.

Now referring to FIG. 3 there is shown a side view of the mounting tray 300 having a top-side 302, a bottom-side 304, a front-end 306 and a rear-end 308. Disposed along the bottom-side 304 of tray 300 generally toward front end 306 where the display is inserted, is spring-loaded screw receiving apparatus 310 which is described in further detail in FIG. 4.

Figure 4:
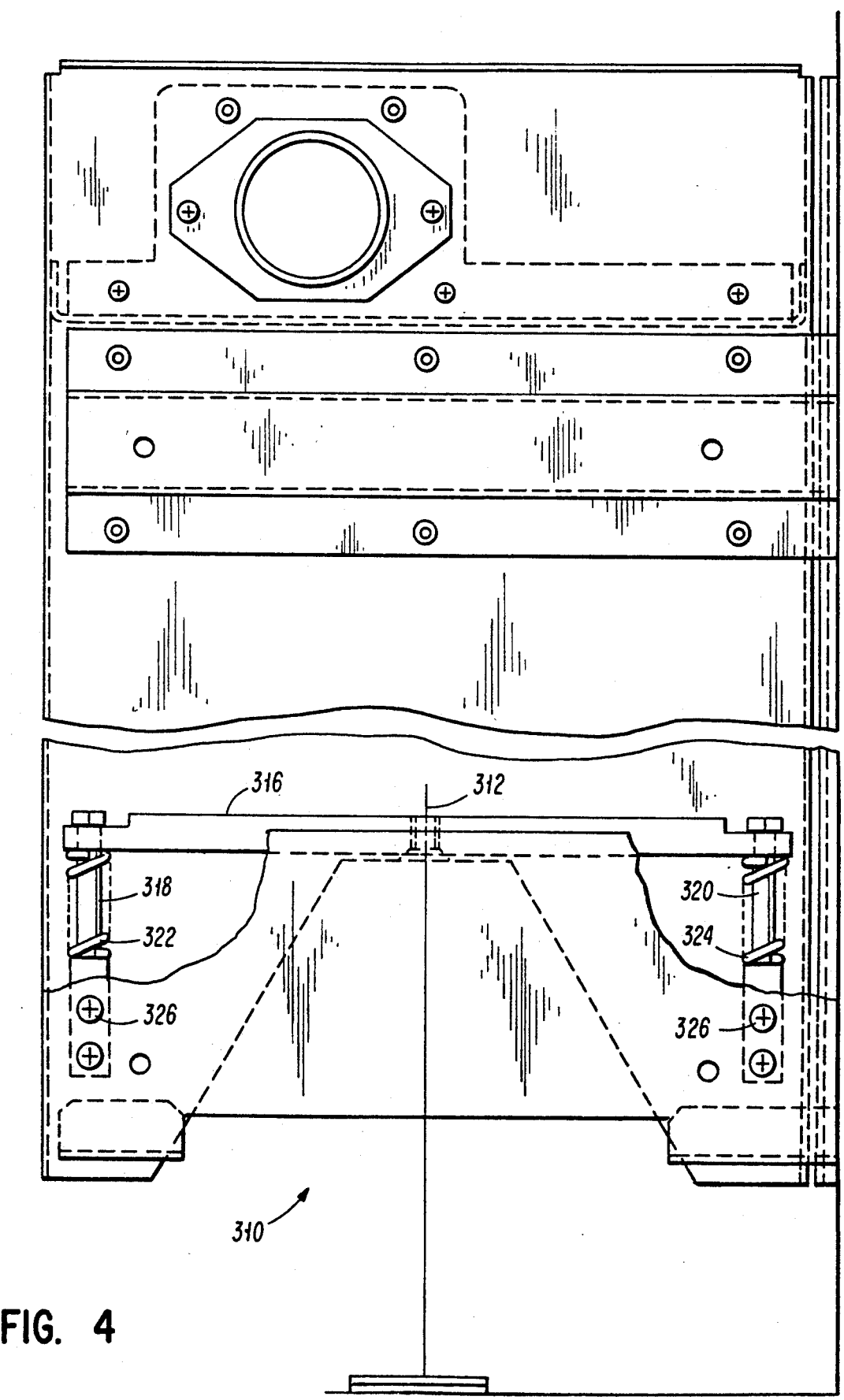
FIG. 4 is a cutaway bottom view of the mounting tray of the present invention, showing a central axis line where the display device screws into the mounting tray.

Now referring to FIG. 4, there is shown the spring loaded screw receiving apparatus 310 of FIG. 3 which shows spring loaded cross member 316 including threaded hole 312 for receiving threaded shaft 148. Cross member 316 is spring loaded for sliding motion along the shafts 318 and 320 with springs 322 and 324 respectively.

In operation, the avionics display device, of the present invention achieves its material advantages as follows:

The handle 112 and the outer tube 122 are attached together resulting in no relative movement. The release button 118 is also installed in this assembly and retains only two degrees of freedom, namely rotational and limited longitudinal travel. The threaded shaft 148 has a hex configuration which when placed inside of the outer tube 122 forms an assembly which exhibits only longitudinal sliding motion and no rotational freedom due to the mating hex hole in the outer tube 122. The tube ball bearings 154, 156 fit through the voids in the inner tube 150 which acts as a carrier during longitudinal motion. FIG. 1A shows the handle 112 in the stowed configuration with all components in their respective positions. Upon actuation of the two slide latches 114, 116, handle 112 will be released from the bezel 104 and forced out by the spring 180. The handle 112 can then be grasped and pulled out to the extended locked position. As the threaded shaft 148 and the outer tube 122 part, the balls are carried down the rod 120 until interference occurs between the balls and the ramp 160 of rod 120, this interference causes the release button 118 to be depressed against the spring action of spring 180 allowing the voids in the outer tube 122 to align with the interior voids of the inner tube. With these holes aligned the balls can move radially and the release button 118 is then allowed to return to its original position causing the tubes to be locked together by the balls. When the two tubes are locked together and the display device box 106 is slid into the mounting tray, the securing of the display device box 106 to the spring loaded screw receiving apparatus 310 of mounting tray 300 can be accomplished by rotating the handle and thereby threading the threaded shaft 148 into the threaded hole 312. When the threaded shaft 148 is fully in the threaded hole 312 the springs will begin to compress thereby holding the box firmly in position while still allowing a small degree of further movement. Upon depression of the release button 118, the balls are again allowed to fall back down the ramp 160 to the smaller diameter portion of the rod 120 allowing the inner tube and the outer tube to freely slide to the stowed position.

The improved avionics display system with enhanced mounting capability, of the present invention, and many of its attendant advantages will be understood from the foregoing description and it will be apparent that various changes may be made in the form, construction, and the arrangement of the parts, without departing from the spirit and scope of the invention, or sacrificing all of their material advantages, the form herein being merely a preferred or exemplary embodiment thereof.

I claim:

1. An improved avionics display device comprising:
   a container means having a top and a bottom;
   a display generating means for displaying visual images in response to an input signal, disposed in said container means;
   a bezel disposed on said container means and about said display generating means;
   a collapsible handle means coupled with said container means and disposed adjacent said bezel so that said handle means is collapsible in a direction toward said bezel;
   a mounting tray detachably coupled with said container means;
   said collapsible handle means having a threaded screw thereon;
   said handle means further having a first spring latch for cooperating with said bezel and a second said spring latch for cooperating with said bezel;
   an internal elongated rod disposed within said handle means; and,
   a spring loaded release button coupled with said handle means and said internal elongated rod.

* * * * *